United States Patent [19]
DeLong

[11] 3,949,702
[45] Apr. 13, 1976

[54] INDICATING DEVICE

[75] Inventor: Robert J. DeLong, Temple City, Calif.

[73] Assignee: Spectrol Electronics Corporation, City of Industry, Calif.

[22] Filed: June 19, 1974

[21] Appl. No.: 480,763

[52] U.S. Cl............ 116/124 A; 116/115; 116/DIG. 21
[51] Int. Cl.² ........................................... G09F 9/00
[58] Field of Search ............ 116/115, 124 A, 129 F, 116/DIG. 21; 338/196; 403/357, 355

[56] References Cited
UNITED STATES PATENTS

| | | | |
|---|---|---|---|
| 2,746,417 | 5/1956 | McCord | 116/115 |
| 2,805,636 | 9/1957 | Smith | 116/DIG. 21 |
| 3,183,885 | 5/1965 | Venema | 116/115 |

Primary Examiner—S. Clement Swisher
Attorney, Agent, or Firm—J. Raymond Curtin; Barry E. Deutsch

[57] ABSTRACT

A device for indicating the angular position of a rotatable member of a type adapted for mounting on a panel. A bracket for mounting the device on the panel includes a first axially extending tang adapted for insertion into a slot formed in a first portion of the indicating device. The slot includes two spring fingers extending radially inward. The spring fingers engage the tang to prevent the indicating device from rotating relative to the panel.

3 Claims, 4 Drawing Figures

INDICATING DEVICE

BACKGROUND OF THE INVENTION

This invention relates to a device for indicating the angular position of a rotatable member, and in particular to a bracket for mounting the device on a panel.

Devices such as variable resistors are employed in many varied applications. Very often, it is desired to accurately control and/or know the angular position of a rotatable member, for example the shaft of a variable resistor. To achieve the foregoing, indicating devices of various types may be connected to the rotatable member of the device being monitored or otherwise controlled. Very often, the device being controlled or monitored is mounted on a panel. Accordingly, the indicating device must similarly be mounted on the panel.

In many applications employing indicating devices, accuracy is of extreme importance. With many mounting arrangements heretofore employed, a small amount of relative movement between the indicating device and the mounting panel has occurred. This relative movement, otherwise known as "backlash," reduces the overall accuracy of the indicating device. In applications requiring a high degree of accuracy, backlash cannot be tolerated.

SUMMARY OF THE INVENTION

Accordingly, it is an object of the invention to provide an improved indicating device.

It is a further object of the present invention to provide an indicating device having an improved mounting arrangement.

It is yet another object of the present invention to provide a mounting arrangement that eliminates backlash between an indicating device and a mounting panel.

These and other objects of the present invention are obtained in a device for indicating the angular position of a rotatable member adapted for mounting on a panel. Mounting means is secured to the panel so relative movement between the panel and mounting means is prevented. Resilient means connects the mounting means to the indicating device. The resilient means supplies a force to prevent relative movement between the mounting means and the indicating device to thereby prevent relative movement between said indicating device and the panel.

DESCRIPTION OF THE PREFERRED EMBODIMENT

Figure 1:
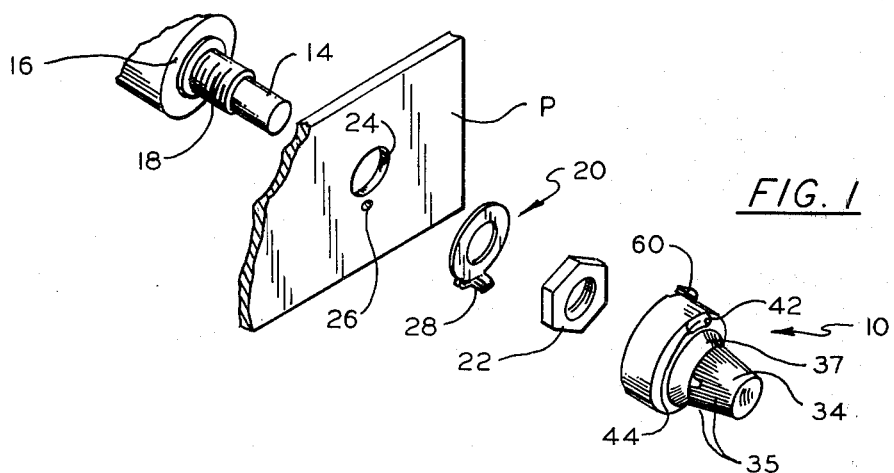
FIG. 1 is an exploded perspective view of a preferred embodiment of the invention.

Referring now to the drawing, there is disclosed a preferred embodiment of the present invention. In referring to the various figures, like numerals shall refer to like parts.

An indicating device 10 to be described more fully hereinafter is adapted for mounting on a mounting panel P. Device 10 has a central bore 12 shown in FIG. 2 for receiving a shaft 14 of an instrument, for example a variable resistor 16. Shaft 14 of resistor 16 protrudes through an externally threaded bushing 18.

The mounting panel P includes a first hole or opening 24 through which shaft 14 and bushing 18 project. Panel P includes a second hole 26 provided for properly registering the indicating device relative to the panel. A mounting bracket 20, to be more fully described hereinafter, is disposed about bushing 18. Briefly, mounting bracket 20 is provided for mounting indicator device 10 on panel P. A lock nut or similar device 22 is provided about bushing 18 to firmly affix bracket 20 in place relative to panel P.

Figure 2:
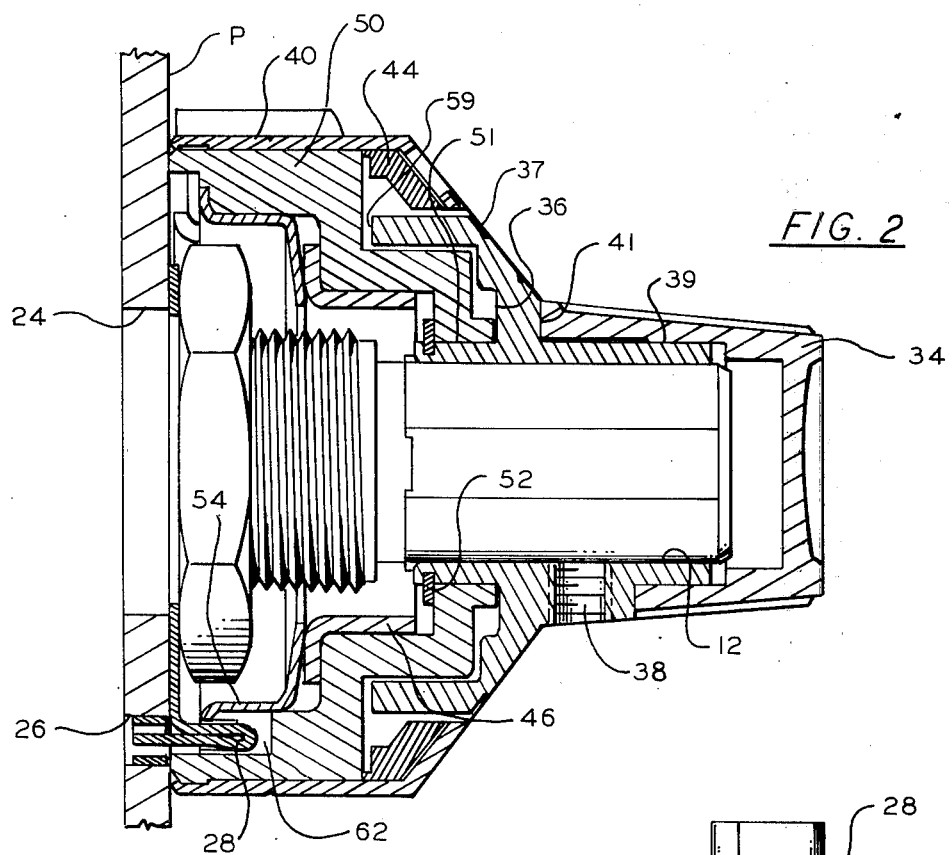
FIG. 2 is a longitudinal sectional view of an indicating device including the present invention.
Figure 3:
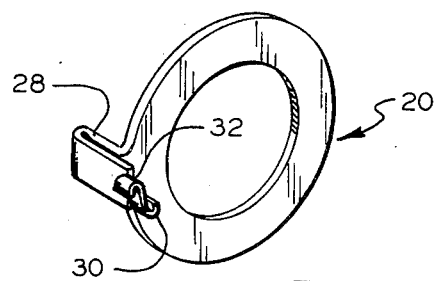
FIG. 3 is a perspective view of a detail of the invention.
Figure 4:
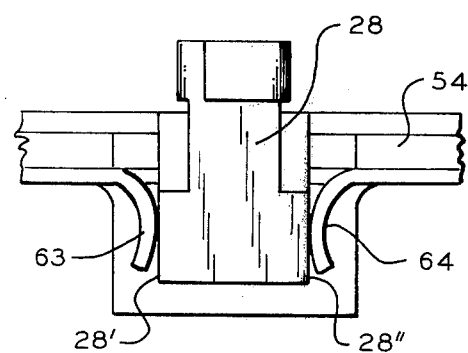
FIG. 4 is an enlarged, fragmentary, plan view, with the various elements rotated 90° from their normal positions, illustrating a further detail of the invention.

Referring now in particular to FIG. 2, there is disclosed a detailed sectional view of a preferred embodiment of indicator device 10.

The illustrated embodiment of device 10 comprises a knob component 34 having a generally frustro-conical shape. As shown in FIG. 1, the outer surface of knob 34 includes axially extended serrations or knurls 35 to provide a better gripping surface for manual operation of the device.

Knob 34 has a bore 39. Bore 39 includes shoulder 41. A first dial 36 is pressed within bore 39 of knob 34. Knob 34 and dial 36 are connected to rotate with shaft 14 via set screw 38. Dial 36 has a series of numerals or other suitable indicia provided on a peripheral surface 37 (shown in FIG. 1).

Device 10 further includes a stationary or base member 50. Base member 50 includes a central bore 51 in which dial 36 is rotatably journaled. A cover 40 is crimped or otherwise affixed to base 50.

Indicator device 10 preferably includes a second dial element 44. Dial element 44 is a turns counting dial and includes a series of numerals or other indicia on its peripheral surface. Cover 40 has a window 42 through which a numeral on the surface of dial 44 may be viewed. The numeral indicates the total number of revolutions of dial 36.

The manner in which the device functions is essentially disclosed in U.S. Pat. No. 2,746,417. In essence, dial 36 includes a gear sector (not shown) extending axially from face 59 thereof. Device 10 further includes an intermediate gear (not shown) rotatably connected to base 50. Dial 44 also includes a gear, the gear on dial 44 being in continuous mesh with the intermediate gear. As dial 36 completes one complete rovolution, the gear sector on its face 59 meshes with the intermediate gear to rotate dial 44 incrementally one numeral per each revolution of dial 36.

Device 10 further includes a shim 52 or similar device to prevent any unwarranted axial movement of the various elements of the device. A brake assembly comprising brake lever 46, brake retainer 54 and a brake control knob 60 is provided to lock rotatable dials 36 and 44 in predetermined positions. Brake retainer 54 is crimped or otherwise secured to base 50. The brake mechanism is more fully disclosed in copending United States patent application filed May 8, 1974, Ser. No. 468,043, in the name of Robert DeLong.

As noted hereinbefore, there are many applications in which the indicator device 10 is employed that require the device to be extremely accurate in indicating the rotatable position of the instrument connected thereto. Heretofore, many arrangements employed for mounting the device on a mounting panel have permitted limited relative movement between the device and panel. The limited movement or "backlash" reduced the desired accuracy of the device. To overcome the foregoing problem, the present invention includes a novel arrangement for mounting indicator device 10 on panel P.

In the preferred embodiment, brake retainer 54 includes a slot or opening 62. Slot 62 is adapted to receive an axially extending tang portion 28 of bracket 20. Disposed within slot 62, are two resilient members 63 and 64. Members 63 and 64 extend radially inward into slot 62. When it is desired to mount device 10 on the panel, tang 28 is placed into slot 62. The tang forces members 63 and 64 to spring radially outward. The force supplied by the members bearing against side walls 28' and 28" of tang 28 prevents any relative movement between device 10 and bracket 20.

Extending axially in an opposed direction to tang 28 are a pair of fingers 30 and 32. Fingers 30 and 32 are adapted to be placed in registration hole 26. The fingers are provided so bracket 20 may be readily rotated relative to panel P.

Tang portion 28 of bracket 20 firmly engages indicator device to prevent any relative movement between the device and the bracket. Additionally, lock nut 22 prevents relative movement between panel P and the bracket. Thus, relative movement between the panel and device 10 is prevented, thereby increasing the accuracy of the device.

While the present arrangement utilizes a locking nut 22 between bracket 20 and device 10, it is within the scope of the invention for bracket 20 to incorporate the feature of nut 22 to thereby eliminate the need for the separate element. Additionally, it should be understood, slot 62 may be formed in a portion of device 10 other than retainer 54. Furthermore, in lieu of members 63 and 64 tang 28 may be made resilient so that in its free state, it is slightly wider than the diameter of slot 62. Tang 28 would then be compressed upon insertion into slot 62. The force produced by compressing tang 28 would prevent relative movement between the device and bracket.

A still further variation within the scope of the present invention includes providing the spring-like members 63 and 64 as a rearwardly extending portion of the indicating device. Also, the bracket may include the spring-like members. With such arrangements, slot 62 would be provided in bracket 20.

While a preferred embodiment of the present invention has been described and illustrated, the invention should not be limited thereto, but may be otherwise embodied within the scope of the following claims.

I claim:

1. In a device for indicating the angular position of a rotatable shaft of a type adapted for mounting on a panel having a first hole provided therethrough for passage of said shaft, said indicating device including a portion having means defining a slot formed therein, the improvement comprising:

a bracket for mounting the indicating device on said panel, said bracket including a first member having side walls and adapted for insertion into said slot of said indicating device, said slot defining means including resilient means having inner surfaces extending parallel to and radially outward from the longitudinal axis of said slot, said first member being inserted into said slot to force said resilient means radially outward to generate a return spring force acting between the inner surfaces of said resilient means and the side walls of said first member to prevent relative movement between said bracket and said indicating device; and means to prevent any relative movement between said bracket and said panel, to thereby prevent any relative movement between said indicating device and said panel.

2. A device for indicating the angular position of a shaft of a variable resistor mounted on a panel, said shaft extending through a first hole provided in said panel, said panel including a second hole, said device comprising:

a first member including means defining a slot provided in a wall facing said panel, said slot defining means including resilient means; and a mounting bracket disposed between said wall of said first member of said device and said panel, said bracket including a first opening for said shaft of said variable resistor, and an axially extending tang portion, said tang being insertable into said slot whereby the outer walls thereof contact the inner walls of said resilient means to spring said resilient means radially outward to provide a force to prevent relative movement between said bracket and said device; and means to prevent relative movement between said bracket and said panel to thereby prevent relative movement between said indicating device and said panel.

3. A device in accordance with claim 2 wherein said mounting bracket includes means extending in a direction opposite to that of said tang, said means being inserted into said second hole to permit said device to be properly indexed relative to said panel.

* * * * *